United States Patent

Alexander et al.

[15] 3,670,585

[45] June 20, 1972

[54] ATTITUDE READOUT FOR FLOATED INERTIAL PLATFORM

[72] Inventors: Newton C. Alexander, Harbor City; Herbert Stark, Torrance; Richard C. Thornton, Lawndale, all of Calif.

[73] Assignee: Northrop Corporation, Beverly Hills, Calif.

[22] Filed: April 17, 1970

[21] Appl. No.: 29,464

[52] U.S. Cl. .................................................. 74/5.6, 74/5.7
[51] Int. Cl. .......................................................... G01c 19/28
[58] Field of Search .................................. 74/5, 5.4, 5.6, 5.7

[56] References Cited

UNITED STATES PATENTS

| | | | |
|---|---|---|---|
| 3,439,546 | 4/1969 | Baker et al. | 74/5.6 |
| 3,097,535 | 7/1963 | Bers | 74/5.7 |
| 3,490,297 | 1/1970 | Brodersen | 74/5 |
| 3,499,332 | 3/1970 | Fingerett et al. | 74/5.6 |

Primary Examiner—Manuel A. Antonakas
Attorney—Sokolski & Wohlgemuth and W. M. Graham

[57] ABSTRACT

A floated inertial platform comprising a ball member floated within an outer sphere utilizes a plurality of conductive concentric "latitude" rings running around the circumference of the ball member and a resistive ring running around the equator of the ball member as pick-off excitation elements. The excitation elements are excited in sequence with signals suitable for obtaining readouts about three mutually orthogonal axes such as roll, pitch, and yaw. Pick-offs which may be in the form of pairs of oppositely located pads and strip members in the form of a segmented "longitude" ring are mounted on the outer sphere adjacent to the ball surface. Readout signals are sequentially obtained from the pick-offs which are in Eulerian coordinates and require no compensation for two axes, the third axis readout being readily compensated for cross coupling effects to provide an accurate output in Eulerian coordinates as well.

18 Claims, 11 Drawing Figures

PATENTED JUN 20 1972  3,670,585

INVENTORS
NEWTON C. ALEXANDER
HERBERT STARK
RICHARD C. THORNTON

BY

SOKOLSKI & WOHLGEMUTH

ATTORNEYS

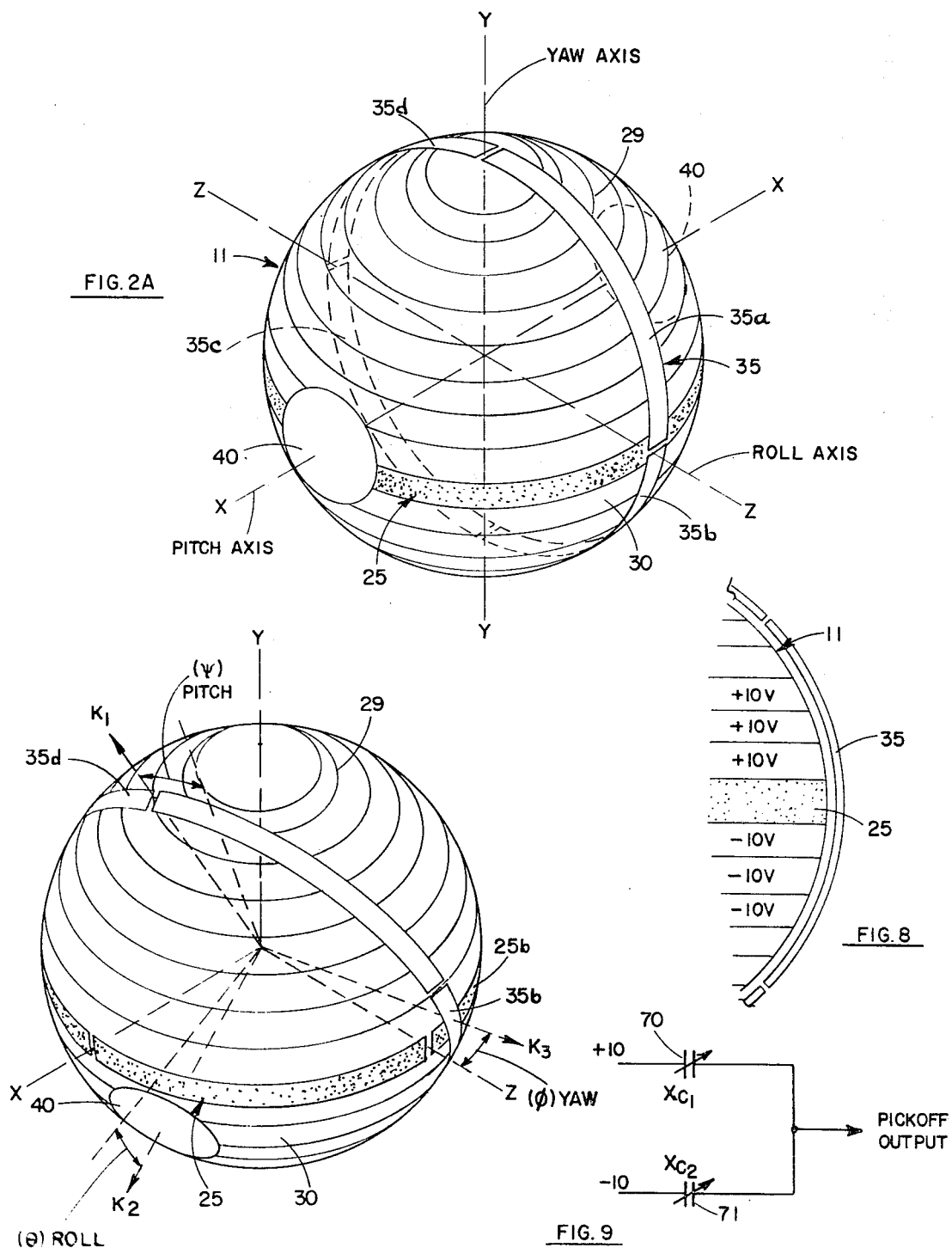

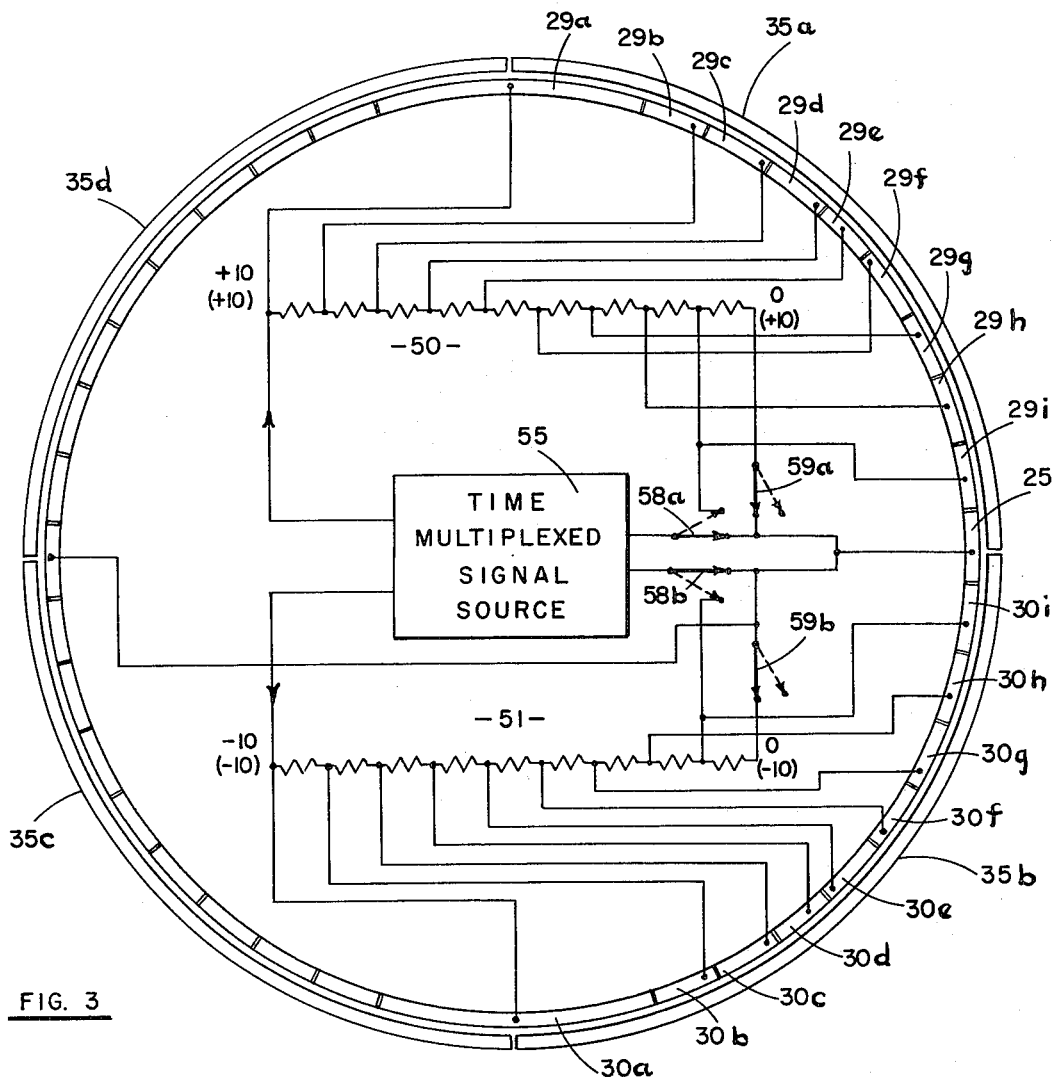
FIG. 3
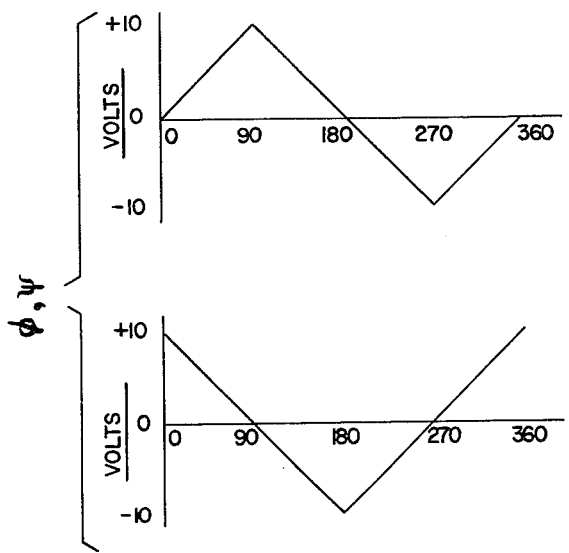
FIG 7A
FIG. 7B
INVENTORS
NEWTON C. ALEXANDER
HERBERT STARK
RICHARD C. THORNTON
BY
SOKOLSKI & WOHLGEMUTH
ATTORNEYS

ATTITUDE READOUT FOR FLOATED INERTIAL PLATFORM

This invention relates to a system for providing a readout in accordance with the attitude about 3 orthogonal axes of a vehicle such as an aircraft or a missile and more particularly to such a system operating in conjunction with a ball shaped inertial platform which is supported on a flotation bearing within a spherical casing.

In U.S. Pat. No. 3,439,546 for a floated inertial platform assigned to Northrop Corporation, the assignee of the instant application, a floated inertial platform which comprises a ball shaped platform member supported for three (3)° of freedom within a spherical casing is described. An attitude readout system is described in this patent which utilizes a capacitive pick-off system having pairs of excitation strips on the platform and pick-off plate members on the spherical casing, this pick-off system capable of generating AC signals, each having a phasal relationship to a fixed reference signal, such phase being accurately indicative of vehicle attitude about one of three mutually orthogonal axes.

The attitude readout system of this invention is suitable for utilization for the same type of floated inertial platform as described in the aforementioned patent, and for certain applications has distinct advantages over the "phas" readout system of such patents. First, the system of this invention is capable of providing readout in Eulerian coordinates for three readout axes, as for example, pitch, roll and yaw. These outputs require no transformation and except for compensation for cross coupling effects for one axis require no other compensation. This is as compared with the readout system of the referenced patent and other readout systems of the prior art which provide outputs which must be transformed into Eulerian coordinates by special computation. Further, the excitation members of the readout system of the instant application are such simpler to fabricate, in that no specially designed excitation bands which have a varying finger density, such as set forth in the aforesaid patent, are required. Fabrication of these special bands is somewhat difficult and expensive in view of the necessity that they be accurately formed. Also, the readout signals of the instant invention are in the form of an amplitude variation in accordance with attitude which is somewhat easier to process than the phase varying signals of the aforesaid patent.

Thus, the attitude readout system of this invention provides distinct advantages over that of the aforementioned patent, providing greater simplicity and economy of construction and readout signals which are provided in Eulerian coordinates without the need for transformation computations.

It is therefore the principal object of this invention to provide an attitude readout system for use with a floated ball platform which is capable of providing certain direct readouts in Eulerian coordinates and which is simpler and more economical to fabricate than similar prior art attitude systems.

Other objects of the invention will become apparent from the following description taken in connection with the accompanying drawings, of which:

FIG. 2a is a schematic view illustrating the excitation and pick-off members of the system of the invention;

FIG. 2b is a schematic view illustrating how the various readout angles are obtained in the system of the invention;

FIG. 3 is a schematic drawing illustrating the excitation circuitry for the excitation rings utilized in the system of the invention.

FIG. 7a and 7b are graphs illustrating the pitch ($\psi$) and yaw ($\Phi$) readout signals obtained in the system of the invention;

FIG. 8 is a schematic drawing illustrating the generation of the pitch pick-off signal in the system of the invention; and FIG. 9 is a schematic drawing further illustrating the generation of the pitch pick-off signal.

As already noted, the attitude readout system of this invention is suitable for utilization in connection with a floated inertial platform such as described in the aforementioned U.S. Pat. No. 3,439,546. This patent is incorporated herein by reference so that the components thereof need not be described (the present invention only being concerned with our attitude readout system for use with a platform such as described in this patent).

Briefly described, the system of this invention comprises a plurality of conductive concentric rings which extend around the circumference of a ball shaped platform member between the "equator" of the ball and the "poles" thereof in the nature of "latitude" rings. These latitude rings have insulating spacings therebetween so that they can be separately excited with predetermined excitation voltages. These latitude rings are utilized to provide excitation signals for pitch and roll readout. Yaw excitation signals are provided to a segmented resistive ring which runs around the equator portion of the ball. This yaw excitation ring is excited with predetermined yaw excitation signals. Pulsed excitation signals for the excitation rings are sequentially provided on a time sharing bases through a programmer, which in succession provides excitation signals needed for each of the desired readouts. Pick-off signals for the roll attitude readout are provided by pad pick-off elements mounted in the spherical casing in which the ball is supported, while pitch and azimuth readout are obtained from longitudinal segmented band pick-offs supported on the casing and running normal to the equator of the ball when the ball is in a position for zero attitude readout.

Figure 1:
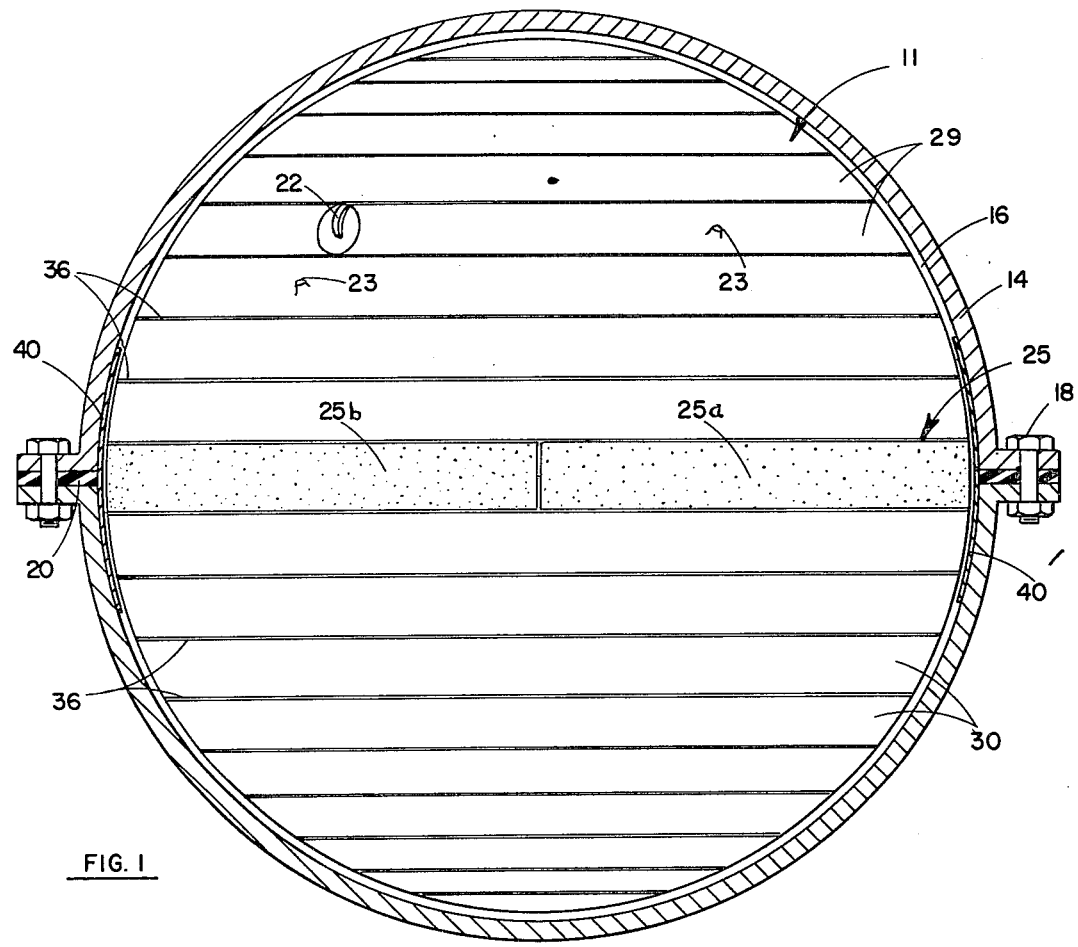
FIG. 1 is a cross-sectional view illustrating the general structural features of one embodiment of the invention, as incorporated into a floated ball platform.

Referring now to FIG. 1, a cross sectional view is shown illustrating the incorporation of the system of the invention into a floated inertial platform. Ball shaped platform member 11 is floated within sphere member 14, which forms a casing therefor on a liquid bearing 16 formed by a thin film of liquid between the ball and the casing. Casing 14 is formed in two hemispherical pieces which are joined together by means of bolts 18, these two halves being electrically insulated from each other by means of insulator ring 20, bolts 18 being fabricated of a nonconductive material. The ball is kept centered in the casing by means of a plurality of roller wheel assemblies 22, communication between equipment contained within the ball member and the casing being provided by feed-through conductor members 23. To avoid any significant discontinuity in the excitation ring along which any one of the roller wheel assemblies may be mounted, these assemblies are electrically connected to their associated rings, the roller wheels being insulated from the rings by means of insulated support pins on which they are rotatably mounted. Contained within ball 11 is the various platform equipment and accessory circuitry needed for its operation. All of such structure is thoroughly described in the aforementioned U.S. Pat. No. 3,439,546 and therefore need not be described again here. The instant invention departs from the disclosure of the prior patent in the attitude excitation and pick-off system which will now be described.

Running around the equatorial portion of ball member 11 is an excitation ring 25, which as later to be described, is utilized for generating a yaw excitation signal. Ring 25 is divided into four equal segments, two of which, 25a and 25b, are shown in FIG. 1. The segments of ring 25 are of a resistive material such as nickel-chromium. The ball may be fabricated of a conductive material such as aluminum which has an insulating coating on its surface over which ring 25 is placed. In a typical embodiment of the device of the invention each of the segments 25a, 25b, etc. has a resistance between opposite ends thereof of about 1000 ohms.

Deposited over the insulated surfaces of ball member 11 are a plurality of conductive excitation rings 29 and 30, half of these rings 29 being above resistive ring 25 and the other half 30 being below the resistive equatorial band. Rings 29 and 30 may be of a highly conductive material such as copper or gold and extend all the way around the ball to form "latitude" rings which are parallel to each other and to equatorial ring 25. The rings 29 and 30 are electrically insulated from each other and from ring 25, by narrow insulating strips 36. Rings 29 and 30 are typically fabricated by first depositing conductive material over the insulative ball surfaces where the rings are located and then cutting out the separator strips 36 with a suitable scoring too. The pick-off members 35 and 40 are located on the inner surfaces of spherical casing 14 as schematically illustrated in FIG. 2a. These pick-offs are of a conductive material and are suitably insulated from each other and from the wall of casing 14 by suitable insulating coatings deposited thereon.

As shown in FIG. 2a, the pick-off band 35, as just noted, is in the form of a conductive ring deposited on the inner surface of the spherical casing and insulated therefrom, and is divided into four equal segments 35a–35d. With ball member 11 in its undisplaced position relative to the casing, i.e., in a situation where the platform is installed in an aircraft, with such aircraft having no displacement about the yaw (Y), roll (Z), or pitch (X) axes, the pick-off band 35 is in the position of a "longitude" ring relative to the ball and runs normal to excitation ring 25 and excitation rings 29 and 30, passing through the "poles" of the ball, the "breaks" or spaces between the segments thereof lying at the poles and equator. The pick-off band 35, as to be explained hereinafter, is utilized to develop both the pitch and yaw output signals. A pair of pad pick-offs 40, which as for band 35 are conductive members located on the inner surfaces of the spherical casing and insulated therefrom, are used to provide roll pick-off signals. Pad pick-offs 40 are located opposite equatorial excitation ring 25 with the spherical casing in its undisplaced condition relative to the ball as shown in FIG. 2a. The pick-offs 40 and 35 form capacitive plates in conjunction with the excitation rings on the ball in in developing the attitude pick-off signals.

Referring now to FIG. 2b, the various readout angles that are obtained about each of the three mutually orthogonal readout axes of interest are schematically illustrated. Thus, FIG. 2b shows the positions that the pick-offs 35 and 40 will assume in the event that the vehicle should simultaneously go through a particular yaw, pitch and roll maneuver, which will of course carry the casing and the pick-off members along with it, relative to the inertially stabilized ball platform. For this particular example, pads 40 move away from the equatorial portion of the ball to a position opposite certain excitation rings 29 and 30, the amount of such movement being indicative of the roll angle represented in FIG. 2b by "$\theta$." It is to be noted that pick-off pads 40 should preferably have a substantially greater diameter than the width of rings 29 and 30, to provide a proper readout signal. Similarly a pitch readout angle "$\psi$" is provided by virtue of the relative displacement of pick-off band 35 relative to rings 29 and 30, the voltage in accordance with this angle being provided from the excitation rings to the pick-off band, and finally a yaw pick-off signal indicated by the angle "$\phi$" is provided to pick-off band 35 by virtue of the relative displacement between this band and excitation ring 25. It is to be noted that the yaw readout ($\phi$) is affected by the roll angle. This is because, as the roll increases, the effective area of pick-off band 35 which is opposite excitation band 25 increases, thereby providing a greater readout signal in view of the increased capacitive coupling. Thus, in the absence of a compensation to correct this, yaw readout for a given actual vehicle yaw would vary in accordance with the roll angle of the vehicle. This yaw output signal must therefore be compensated to correct for this "cross coupling" effect, by modifying the azimuth readout from pick-off 35 by a signal in accordance with roll angle. This compensation is readily accomplished in an appropriate compensation circuit in the electronic processing circuitry.

It is to be noted that the readout signals represent the actual attitude of the aircraft in space and thus provide signals in Euler coordinates without any need for transformation.

Figure 5:
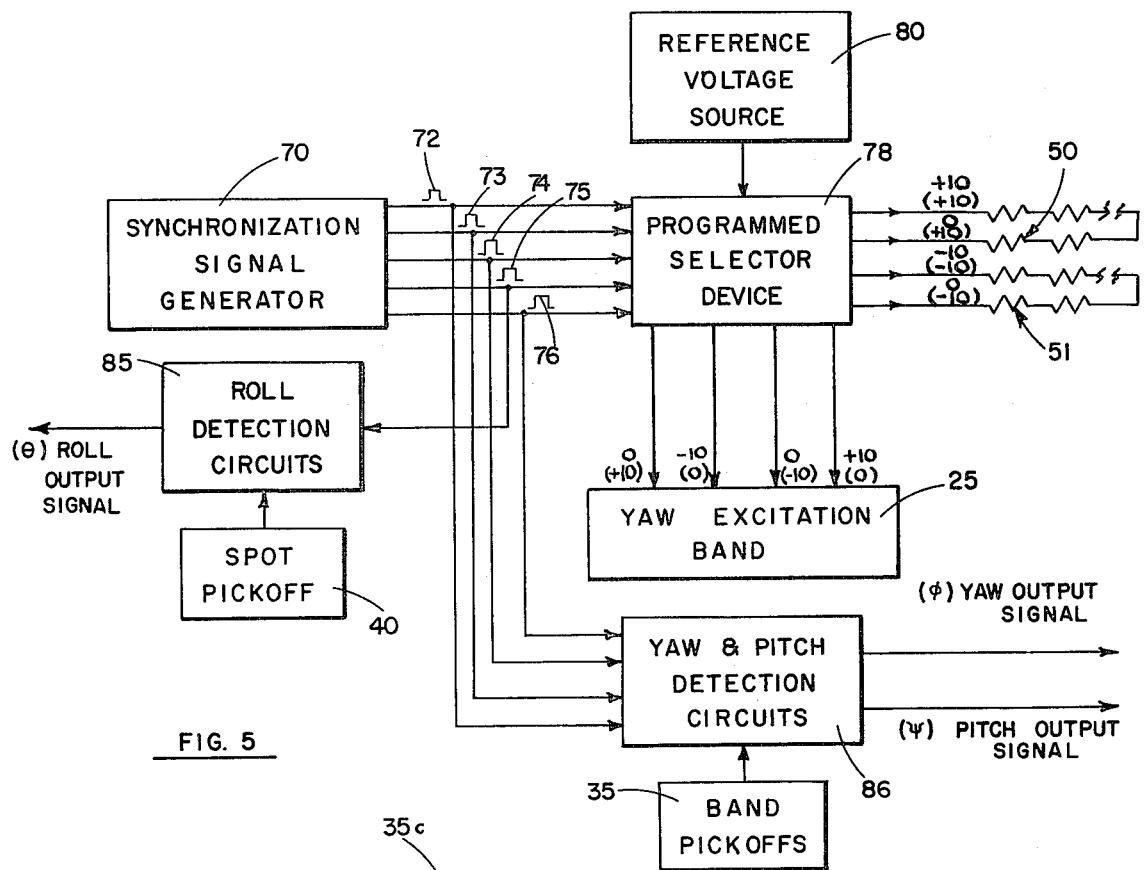
FIG. 5 is a functional block diagram illustrating the generation of the excitation and readout signals in the system of the invention.

As to be explained further on in the specification, in the explanation of FIG. 5, the excitation rings are sequentially energized with predetermined signals and various roll, pitch and yaw output signals taken from the pick-offs in accordance with a predetermined program from suitable time multiplexing circuitry provided for this purpose. The generation of these various output signals will now be discussed.

Figure 6:
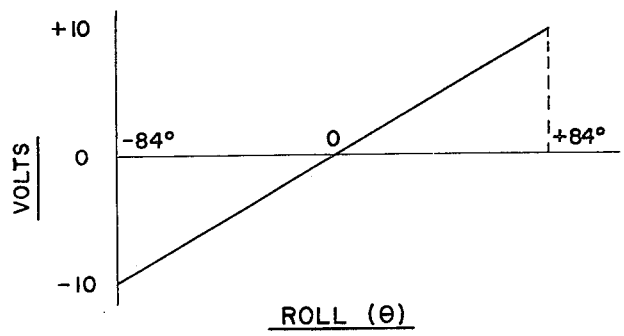
FIG. 6 is a graph illustrating the roll ($\theta$) output signal obtained in the system of the invention.

Referring now to FIG. 3, excitation circuitry for the conductive rings is schematically illustrated. Each of the taps of voltage divider 50 is connected to a separate one of conductive rings 29a–29i, while the taps of voltage divider 51 are connected to associated ones of rings 30a–30i. It is to be noted that the excitation voltage signals are pulsating DC to enable capacitive coupling thereof between the rings and the pick-offs. During a first operating sequence, time multiplexed signal source 55 provides a fixed voltage difference across voltage divider 50 which may be +10 volts as indicated in FIG. 3. At the same time −10 volts is placed across voltage divider 3. During this excitation sequence, switches 58a, 58b, 59a and 59b are thrown to the positions indicated by the solid lines in FIG. 3, thus connecting the zero voltage output of signal source 55 to one end of each of the voltage dividers and also to all of the sections of resistive ring 25. Under these conditions, a gradation of voltages between +10 volts and 0 are placed on each of conductive rings 29a–29i and resistive ring 25, while voltages gradated between −10 volts and 0 volts are placed on each of conductive rings 30a–30i and resistive ring 25. This excitation sequence is utilized to provide a roll output signal to pick-off pads 40 as illustrated in FIG. 6. Thus, as can be seen with reference to FIG. 2b, the pick-off pads will receive the voltage of the oppositely positioned excitation ring by virtue of the capacitive coupling therebetween, each such voltage representing a particular roll angle $\theta$.

As illustrated in FIG. 6, for the particular embodiment shown, voltage outputs for roll readout angles between +84° and −84° can be accurately provided, this being suitable for most application requirements. Accurate readouts to 90° could of course be provided by utilizing additional excitation rings in the polar regions of the ball. The outputs of pick-off pads 40 are appropriately combined in the processing circuitry to eliminate errors in the readout which might result from inadvertent translational displacement of the ball relative to the casing which would tend to increase the capacitive coupling between one of the pads and the ball and decrease such coupling between the opposite pad and the ball a like amount. The resultant increase and corresponding decrease in the signals fed to these two pads caused by small translational movements can be effectively cancelled out by appropriate algebraic summing.

Still referring to FIG. 3, another timing sequence is provided for obtaining the pitch readout during which the multiplexed signal source 55 feeds +10 volts to both of the ends of voltage divider 50 and −10 volts to both of the ends of voltage divider 51. Switches 58a, 58b, 59a and 59b are thrown to the positions indicated by the dotted lines during this sequence. Under such conditions, each of conductive rings 29a–29i has +10 volts thereon while the conductive ring 30a–30i have −10 volts thereon, ring 25 being tied to zero volts.

Referring now to FIGS. 8 and 9, a pitch readout signal is obtained form the band pick-off in the following manner: A portion of pick-off 35 shown in FIG. 8 above equatorial ring 25 forms a capacitance with the oppositely positioned portions of ball 11, which can be represented by capacitor 70 in FIG. 9. Similarly the portions of the pick-off band segment below ring 25 forms a capacitance which can be represented by capacitor 71 in FIG. 9. The capacitance of "capacitor" 70 is greater than that of "capacitor" 71 when more of band 35 is above the equatorial portion than below and vice versa. Thus it can be seen, that varying capacitive portions 70 and 71 form a voltage divider, the net voltage appearing on band 35 being a function of the relative capacitances of the two capacitive portions which is a function of the positioning of the pickoff band. The outputs of oppositely positioned band sections 35a and 35c (FIG. 2b) are combined to cancel out errors due to translational movement, as are the outputs of oppositely positioned band sections 35b and 35d. The two outputs are appropriately processed to provide an unambiguous output voltage for 360° of pitch as illustrated in FIGS. 7a and 7b, FIG. 7a indicating the outputs of one of the pairs of band sections while FIG. 7b indicates the output of the other of the pairs. Two readouts are thus provided for each angular position so that ambiguities present, with only a single readout signal, can be resolved in logical processing circuitry.

Figure 4:
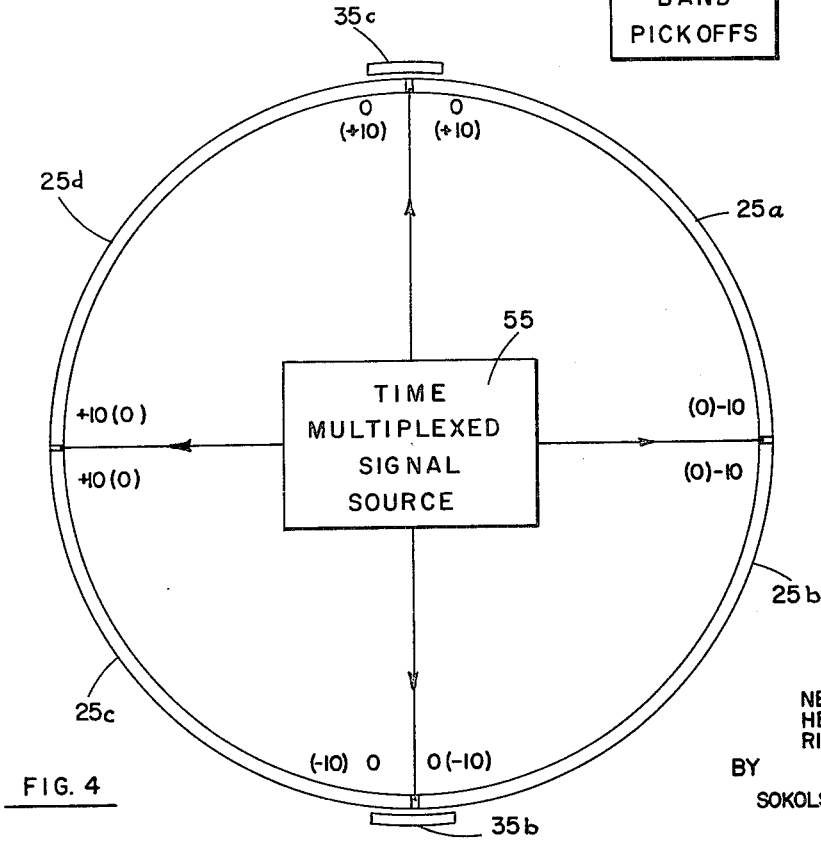
FIG. 4 is a schematic drawing illustrating the excitation of the resistive equatorial band utilized in the system of the invention.

Referring now to FIGS. 4, 7a and 7b, the operation of the yaw pick-off and excitation circuitry is schematically illustrated. As already noted, the yaw excitation ring is of resistive material deposited along the equator of the ball member. The yaw excitation ring is divided into four equal segments, 25a–25. The segments are excited with voltages provided by time multiplexed signal source 55 during two excitation sequences for yaw signal readout. During the first of these sequences, indicated by the unparenthesized notations in FIG. 4, resistive segment 25a has −10, 0 voltage pulses placed across it; segment 25b has −10, 0 volts placed thereacross; segment 25c has 0, +10 volts thereacross, while segment 25d has +10, 0 volts placed thereacross. As the vehicle experiences a yaw motion, it carries along with it the spherical casing 14 and segmented pick-off bands 35a–35d located thereon, as shown for example, in FIG. 2b. For the yaw angle $\phi$, shown in FIG. 2b, band 35b moves along segment 25b to a position corresponding to this yaw angle. In view of the fact there is a uniform voltage drop across resistive segment 25b, a voltage between 0 and −10 volts will be capacitively coupled from the band to the pick-off which corresponds to the yaw angle. At the same time the pick-off band segment 35c will move to a position opposite excitation segment 25d and will receive a voltage between 0 and +10 volts corresponding to yaw angle. The two signals are appropriately combined in logical circuitry to provide a yaw readout, such a combination of signals from the oppositely positioned pick-offs being utilized to eliminate errors due to translational movement between the casing and the ball member which would change the capacitive coupling and hence the magnitude of the coupled voltage.

A graph of readout voltages for various yaw angles is shown in FIG. 7a. As can be seen, there is a readout ambiguity for any angle. That is, any one voltage readout can represent either of two yaw angles. This ambiguity is resolved by taking a second readout during a subsequent readout sequence. For this readout the voltages applied across each of the excitation bands 25a–25d are shifted as indicated in FIG. 4 by the numerals in parenthesis at each of the connection points. A graph illustrating the readouts for various yaw angles for the shifted excitation voltages is shown in FIG. 7b. Thus, a second set of voltages for each yaw angle is obtained during a subsequent readout, which, when compared with the readouts shown in FIG. 7a in logical circuitry, enable the unambiguous determination of all yaw angles between 0° and 360°. Thus, for example, for yaw angles between 0° and 90° positive voltages are provided for both the unshifted and shifted readouts, while for angles between 90° and 180° positive voltages are provided for the unshifted readout while negative voltages are provided for the shifted outputs, and similarly for readouts between 180° and 270° negative readouts are provided for both the unshifted and shifted readouts while for yaw angles between 270° and 360° a negative readout is provided for the unshifted and a positive readout for the shifted readout.

Referring now to FIG. 5, a functional block diagram, illustrating the basic time multiplexing operation of the system of the invention in obtaining sequential readout signals on a sampling basis is shown. The synchronization signal generator 70 provides a series of sequential synchronization signals 72–76, each one of these signals operating to initiate one of the readout sequences in the program. Sequential synchronization signals 72–76 are fed to programmed selector device 78. Selector device 78 receives reference voltages (which in the example are +10 volts and −10 volts) from reference voltage source 80. For roll and pitch signal sampling, programmed selector device 78 sequentially feeds voltages to voltage dividers 50 and 51 for the conductive rings as described in connection with FIG. 3. These two excitation sequences are synchronized by means of synchronization pulse 75 for roll readout and pulse 76 for pitch readout. Synchronization pulse 75 is also used to synchronize the operation of roll detection circuits 85 which receive output signals indicative of roll angle from spot pick-offs 40 while pulse 76 synchronizes pitch detection of the output of pick-offs 35 in yaw and pitch detection circuits 86. Similarly, synchronization signals 72 and 73 are utilized to cause programmed selector device 78 to excited yaw excitation band 25 for shifted and unshifted operation in sequence and to synchronize the operation of the yaw output circuits with signals received thereby from band pick-offs 35. Synchronization pulse 74 is utilized to initiate the operation sequence wherein a compensation signal for the yaw readout in accordance with the roll angle is developed. This, as already noted, is to compensate for roll cross coupling in the presence of yaw pick-off signals. The compensation signal is developed in the yaw excitation band 25 and yaw and pitch detection circuits 86.

The programmed selector device, yaw and pitch detection circuits and roll detection circuits can readily be implemented by conventional logical control circuitry, which is within the realm of one skilled in the art and therefore need not be described in detail herein.

The system of this invention thus provides means for obtaining on a time sharing basis attitude readout from a floated ball inertial platform. By virtue of the excitation and pick-off implementation direct readouts in Euler angle coordinates are obtained.

We claim:

1. In an attitude readout system including a ball member and a spherical casing member for determining the relative orientation between said ball member and said spherical casing member in which said ball member is supported, said ball member having predetermined equatorial and polar portions:

a plurality of separate excitation rings running around the circumference of said ball member, said excitation rings being concentric with and parallel to each other and the equatorial portion and covering the ball member between the polar portions thereof, said rings further being insulated from each other, means for sequentially exciting said rings with voltages in accordance with a predetermined program, and pick-off means on said casing member for detecting the voltages on portions of said rings opposite thereto, said voltages being in accordance with the relative orientation between the two members.

2. The system of claim 1 wherein said excitation rings include a resistive ring running along the equatorial portion of said ball member and conductive rings between said resistive ring and the polar portions of the ball member.

3. The system of claim 2 wherein said means for sequentially exciting said rings comprises means for providing a gradated voltage from ring to ring during a first sequence and a first predetermined voltage to all of the conductive rings on one side of the resistive ring, and a second predetermined voltage to all of the conductive rings on the other side of the resistive ring during a second sequence.

4. The system of claim 2 wherein said resistive rings is segmented into four segments.

5. The system of claim 1 wherein said pick-off means comprises a pair of capacitive pad pick-off members oriented opposite each other and a capacitive longitudinal ring pick-off member, said ring pick-off member being segmented into two pairs of equal sections.

6. In an attitude readout system including a ball member and a spherical casing member for determining the relative orientation between said ball member and said spherical casing member in which said ball member is supported, said ball and casing members having predetermined equatorial and polar portions:
- a resistive excitation ring extending around the equatorial portion of said ball member,
- a plurality of conductive excitation rings running around the circumference of said ball member, said conductive excitation rings being concentric with and parallel to said resistive ring and extending between the resistive ring and the polar portions of the ball members, said rings being electrically insulated from each other,
- means for sequentially exciting said rings with voltages in accordance with a predetermined program, said program including one excitation for said rings providing a gradation in voltage from ring to ring and another excitation where all of the conductive rings on one side of the resistive ring have a first predetermined voltage and all of the rings on the other side of the resistive ring have a second predetermined voltage, and
- pick-off means on said casing member for sequentially detecting the relative orientation of the two members about three mutually orthogonal axes.

7. The system of claim 6 wherein the resistive ring has four equal separate segments, each of said segments being excited with a first predetermined voltage differential thereacross during one of the time sequences of said program and a second predetermined voltage differential thereacross during another of the time sequences of said program.

8. The system of claim 7 wherein said pick-off members comprise a pair of capacitive pad pick-offs located opposite each other on said casing member, and four segmented capacitive pick-offs in the form of conductive bands, said bands extending around the circumference of said casing member.

9. In combination with a ball shaped platform floated within a spherical casing, a system for reading the attitude of said platform relative to the casing including:
- a resistive ring running around the equatorial portion of said ball shaped platform member, said ring being segmented into four equal segments which are insulated from each other,
- A plurality of conductive rings running around the circumference of said ball shaped member parallel to the resistive ring, said conductive rings covering the ball shaped member between the resistive ring and the polar areas of the ball member,
- means for sequentially exciting said resistive ring and said conductive rings with predetermined voltages on a time sharing basis in accordance with a predetermined program, said rings being excited with voltages gradated from ring to ring during a first sequence, all of the conductive rings on one side of the resistive ring receiving a first predetermined voltage and all of the conductive rings on the other side of said resistive ring receiving a second predetermined voltage during a second sequence, and said resistive ring receiving a voltage differential between the opposite ends of each of its segments during a third sequence, and
- a pair of spot pick-off members mounted opposite each other on said spherical casing for detecting displacement of said casing relative to said ball member about a first axis during said first sequence, and longitudinal segmented band pick-off members located on said spherical casing, said band pick-off segments receiving signals in accordance with relative attitude between the members about second and third axes during said second and third sequences respectively.

10. The combination of claim 9 wherein said spot pick-off members comprise conductive plate members forming a capacitance with the surface of the ball member and said band pick-off members comprise conductive strip members, each forming a capacitance with the surface of the ball member.

11. The combination of claim 9 wherein said spot pick-off members are circular and have a diameter greater than the width of said rings.

12. The combination of claim 9 wherein said means for exciting said rings comprises a DC voltage source, a voltage divider having a plurality of taps, each connected to one of said rings and means for selectively switching the outputs of said voltage source to said voltage divider.

13. An attitude readout system including a ball member and a spherical casing surrounding said ball member for reading the relative orientation between said ball member and said spherical casing comprising:
- a plurality of separate excitation rings running around the circumference of said ball member, said rings being parallel to each other and covering said ball member between the polar portions thereof, said rings being electrically insulated from each other,
- means for providing a predetermined excitation voltage to each of said ring members, and
- pick-off means on said casing for detecting the voltage on ring members positioned opposite thereto, this detected voltage being in accordance with the relative orientation between the casing and the ball member.

14. The system of claim 13 wherein said pick-off means comprises a pair of oppositely positioned conductive pads forming a capacitance with the surface of said ball member, said excitation voltage means providing voltages gradated from ring member to ring member.

15. The system of claim 14 wherein said pick-off means additionally comprises a longitudinal conductive band segmented into four sections and running around the inner circumference of said casing, said band sections forming capacitances with the surface of said ball member.

16. The system of claim 13 wherein said conductive excitation rings comprise a resistive ring running around the equatorial portion of said ball member and conductive rings forming latitude rings running around said ball member between the equatorial and the polar portions thereof.

17. The system of claim 16 wherein said resistive ring is divided into four equal segments, a separate excitation voltage being provided to each of said segments.

18. The system of claim 13 wherein said means for providing an excitation voltage comprises time multiplex means for sequentially providing predetermined voltages to said ring members in accordance with a predetermined program so as to sequentially provide attitude information for each of three mutually orthogonal axes, and
- means for synchronizing the readouts from said pick-off means with the excitation of said ring members.

* * * * *